United States Patent
Patel et al.

(10) Patent No.: US 10,237,120 B2
(45) Date of Patent: Mar. 19, 2019

(54) SYSTEMS, DEVICES, AND METHODS FOR DETECTING ETHERNET SEGMENT FAILURE IN AN ETHERNET VIRTUAL PRIVATE NETWORK

(71) Applicant: Cisco Technology, Inc., San Jose, CA (US)

(72) Inventors: Keyur Patel, San Jose, CA (US); Samir Thoria, Saratoga, CA (US); Mitesh Kanjariya, San Jose, CA (US); Manoj Pandey, Milpitas, CA (US)

(73) Assignee: Cisco Technology, Inc., San Jose, CA (US)

(*) Notice: Subject to any disclaimer, the term of this patent is extended or adjusted under 35 U.S.C. 154(b) by 73 days.

(21) Appl. No.: 15/392,346

(22) Filed: Dec. 28, 2016

(65) Prior Publication Data

US 2018/0183654 A1    Jun. 28, 2018

(51) Int. Cl.
*H04L 12/24* (2006.01)
*H04L 12/723* (2013.01)
*H04L 12/46* (2006.01)
*H04L 12/26* (2006.01)

(52) U.S. Cl.
CPC ...... *H04L 41/0654* (2013.01); *H04L 12/4641* (2013.01); *H04L 41/0686* (2013.01); *H04L 43/0811* (2013.01); *H04L 43/10* (2013.01); *H04L 45/50* (2013.01)

(58) Field of Classification Search
CPC ............. H04L 12/4641; H04L 41/0654; H04L 41/0686; H04L 45/50
See application file for complete search history.

(56) References Cited

U.S. PATENT DOCUMENTS

| | | | |
|---|---|---|---|
| 2016/0211989 A1* | 7/2016 | Jain | H04L 12/4633 |
| 2017/0099180 A1* | 4/2017 | Singh | H04L 12/413 |
| 2017/0195220 A1* | 7/2017 | Sivaraj | H04L 45/66 |
| 2017/0288970 A1* | 10/2017 | Lin | H04L 41/12 |

OTHER PUBLICATIONS

Katz, D. et al., "RFC 5880—Bidirectional Forwarding Detection (BFD)," Internet Engineering Task Force (IETF), 2010.
Mahalingam, M. et al., "RFC 7348—Virtual eXtensible Local Area Network (VXLAN): A Framework or Overlaying Virtualized Layer 2 Networks over Layer 3 Networks," Internet Engineering Task Force (IETF), 2014.
Sajassi, A. (Ed.) et al., "RFC 7432—BGP MPLS-Based Ethernet VPN," Internet Engineering Task Force (IETF), Feb. 2015.
Pallagatti, S. (Ed.) et al., "Internet Draft—BFD for VXLAN," Internet Engineering Task Force, Jun. 2016.
Aggarwal, R. et al., "RFC 5884—Bidirectional Forwarding Detection (BFD) for MPLS Label Switched Paths (LSPs)," Internet Engineering Task Force (IETF), Jun. 2010.
Border Gateway Protocol Control Plane for Virtual Extensible LAN, Cisco White Paper, Jan. 2015.

* cited by examiner

*Primary Examiner* — Benjamin H Elliott, IV
(74) *Attorney, Agent, or Firm* — Meunier Carlin & Curfman LLC (57) ABSTRACT

Systems, devices, and methods for detecting an Ethernet segment failure in an Ethernet virtual private network (EVPN) are described herein. An example method can include monitoring for failure of an Ethernet segment, establishing a bidirectional forwarding detection (BFD) session with a remote peer, and transmitting a BFD control packet to the remote peer over a network. The BFD control packet can include a notification of the failure of the Ethernet segment.

17 Claims, 6 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Vers |  Diag   |Sta|P|F|C|A|D|M|  Detect Mult  |    Length     |
+-+-+-+-+-+-+-+-+-+-+-+-+-+-+-+-+-+-+-+-+-+-+-+-+-+-+-+-+-+-+-+-+
|                       My Discriminator                        |
+-+-+-+-+-+-+-+-+-+-+-+-+-+-+-+-+-+-+-+-+-+-+-+-+-+-+-+-+-+-+-+-+
|                      Your Discriminator                       |
+-+-+-+-+-+-+-+-+-+-+-+-+-+-+-+-+-+-+-+-+-+-+-+-+-+-+-+-+-+-+-+-+
|                    Desired Min TX Interval                    |
+-+-+-+-+-+-+-+-+-+-+-+-+-+-+-+-+-+-+-+-+-+-+-+-+-+-+-+-+-+-+-+-+
|                   Required Min RX Interval                    |
+-+-+-+-+-+-+-+-+-+-+-+-+-+-+-+-+-+-+-+-+-+-+-+-+-+-+-+-+-+-+-+-+
|                 Required Min Echo RX Interval                 |
+-+-+-+-+-+-+-+-+-+-+-+-+-+-+-+-+-+-+-+-+-+-+-+-+-+-+-+-+-+-+-+-+
```

*FIG. 5A*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Auth Type   |   Auth Len    |    Authentication Data...     |
+-+-+-+-+-+-+-+-+-+-+-+-+-+-+-+-+-+-+-+-+-+-+-+-+-+-+-+-+-+-+-+-+
```

*FIG. 5B*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Vers |  Diag   |Sta|P|F|C|A|D|M|  Detect Mult  |    Length     |
+-+-+-+-+-+-+-+-+-+-+-+-+-+-+-+-+-+-+-+-+-+-+-+-+-+-+-+-+-+-+-+-+
|                       My Discriminator                        |
+-+-+-+-+-+-+-+-+-+-+-+-+-+-+-+-+-+-+-+-+-+-+-+-+-+-+-+-+-+-+-+-+
|                      Your Discriminator                       |
+-+-+-+-+-+-+-+-+-+-+-+-+-+-+-+-+-+-+-+-+-+-+-+-+-+-+-+-+-+-+-+-+
|                    Desired Min TX Interval                    |
+-+-+-+-+-+-+-+-+-+-+-+-+-+-+-+-+-+-+-+-+-+-+-+-+-+-+-+-+-+-+-+-+
|                   Required Min RX Interval                    |
+-+-+-+-+-+-+-+-+-+-+-+-+-+-+-+-+-+-+-+-+-+-+-+-+-+-+-+-+-+-+-+-+
|                 Required Min Echo RX Interval                 |
+-+-+-+-+-+-+-+-+-+-+-+-+-+-+-+-+-+-+-+-+-+-+-+-+-+-+-+-+-+-+-+-+
|                       ESI Bitmap Field                        |
+-+-+-+-+-+-+-+-+-+-+-+-+-+-+-+-+-+-+-+-+-+-+-+-+-+-+-+-+-+-+-+-+
```

*FIG. 6*

SYSTEMS, DEVICES, AND METHODS FOR DETECTING ETHERNET SEGMENT FAILURE IN AN ETHERNET VIRTUAL PRIVATE NETWORK

BACKGROUND

According to the Ethernet virtual private network (EVPN) Fast Withdraw procedure, when an Ethernet segment indicator (ESI) failure occurs at a provider edge (PE) device, Border Gateway Protocol (BGP) is used to withdraw an Ethernet Auto Discovery (EAD)/Ethernet segment (ES) route from the PE device (e.g., the local BGP peer) pertaining to the failed ESI. When a remote BGP peer receives notification of the withdrawal of the EAD/ES route from the local BGP peer, the remote BGP peer locally withdraws the same EAD/ES route. In addition, the remote BGP peer removes the IP address of the local BGP peer from the equal-cost-multi-path (ECMP) path for forwarding for the failed ESI. The goal of the EVPN Fast Withdraw procedure is to provide data-plane convergence based on a single message instead of relying on withdrawal of individual EVPN Route Type 2 routes.

Although it seems desirable to prioritize the EAD/ES route withdrawal so that the data plane can converge faster for the remote BGP peers, the EAD/ES withdrawal routes are sent using (relatively slow) Transmission Control Protocol (TCP), where the latency can be of the order of seconds, according to BGP. Thus, the EVPN Fast Withdraw procedure is ultimately limited by the rate at which BGP can send EAD/ES withdrawal routes to the remote BGP peers. To reduce this latency, the use of Bidirectional Forward Detection (BFD) with BGP sessions has been recommended to detect failure of BGP peers. However, even with BFD monitoring of BGP peer failure, two severe limitations would exist when deploying EVPN in data centers.

First, for data-center Leaf-Spine topology, BGP sessions are not established between top-of-rack (TOR) devices. Instead, each TOR device peers with a spine device. So, even if BFD monitoring is performed with BGP session between a TOR device and a spine device and an ESI failure occurs at the TOR device, then BGP on the spine device must still send the withdrawal of the EAD/ES route to the other TOR device over the relatively slow TCP path. Therefore, it is only possible to leverage BFD on one of the two hops between the TOR devices. In particular, BFD is leveraged only on the TOR device to Spine hop of the TOR device to Spine (i.e., hop 1) and Spine to other TOR device (i.e., hop 2) hops.

Second, for deployments with multiple spine devices, BGP adds an additional churn due to its best-path handling. For example, a data center deployment can include two TOR devices—TOR1 and TOR2—as Leaf nodes that are connected to two Spines devices—Spine1 and Spine2. When an ESI failure occurs at TOR1, TOR2 has two EAD/ES routes due to peering with Spine1 and Spine2. When Spine1 withdraws its EAD/ES route, TOR2 would still not issue a local withdraw since it would still have the EAD/ES from Spine2. Thus, TOR2 would only remove TOR1 from ECMP forwarding for the failed ESI when both EAD/ES routes are withdrawn. Waiting for all the paths for EAD/ES to be withdrawn can potentially add more latency to the EVPN Fast-Withdraw procedure. This problem can potentially exacerbate in deployments with more Spine devices.

It should be understood that BFD is used conventionally to detect BGP peer failure and withdrawal of EAD/ES routes is communicated using BGP in the data center deployments described above. BFD is not used in these examples to detect ESI failure and/or to provide the ability to monitor ESI availability on remote peers as described below.

BRIEF DESCRIPTION OF THE DRAWINGS

The components in the drawings are not necessarily to scale relative to each other. Like reference numerals designate corresponding parts throughout the several views.

FIGS. 5A and 5B illustrate a BFD control packet as described herein.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for detecting an Ethernet segment failure in an EVPN, it will become evident to those skilled in the art that the implementations are not limited thereto.

Overview

The systems, devices, and methods described herein extend BFD to achieve rapid and efficient ESI-level failure detection. The systems, devices, and methods described herein also provide rapid convergence for both core failure (e.g., TOR failure) and access failure (e.g., port-channel/ESI failure). For example, the systems, devices, and methods described herein can achieve sub-second ECMP convergence when an ESI failure occurs in an EVPN. BFD can be used over a VXLAN or MPLS network to perform a rapid (e.g., sub-second) failure detection when a port channel or port bundle associated with an ESI fails. In particular, the use of BFD with VXLAN or MPLS networking schemes can be extended to include ESI-based monitoring. As described below, BFD control packets can be sent at sub-second time intervals (e.g., about every 50 milliseconds), which facilitates achieving ESI failure detection in sub-second timescale. Thereafter, the appropriate EAD routes or ES routes can be rapidly withdrawn in response to detecting ESI failure, which results in faster data plane convergence as compared to the conventional technique for withdrawing EAD/ES route withdrawal described above. Additionally, using BFD with VXLAN or MPLS networking schemes, it is possible to use a single tunnel (e.g., a VXLAN or MPLS logical tunnel) between two TOR devices, which eliminates the need to have multi-hop BFD sessions between TORs.

Example Embodiments

Figure 1:
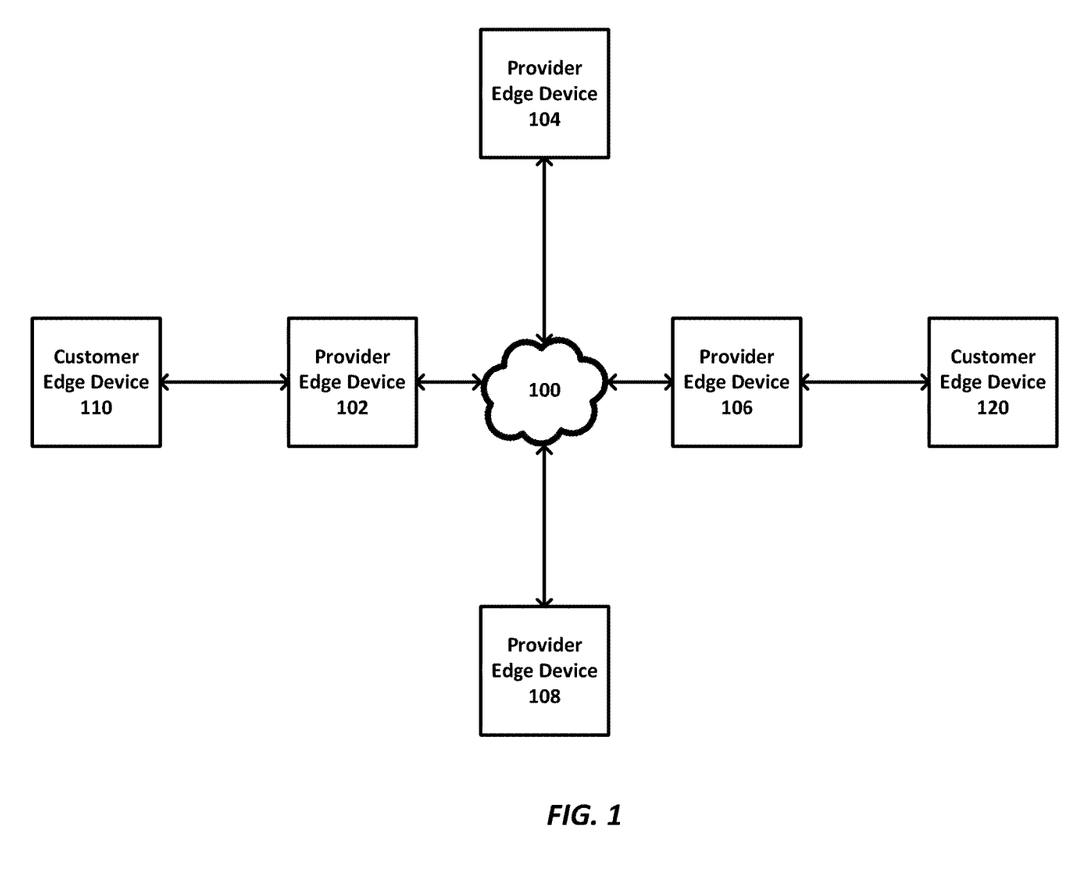
FIG. 1 is a block diagram of an example EVPN according to implementations described herein.

Referring now to FIG. 1, an example EVPN according to implementations described herein is shown. The EVPN can include a plurality of network devices. For example, the EVPN can include hosts, switches, routers, bridges, gateways, and/or other computing devices. The network devices can be communicatively coupled to each other through one or more communication links. Optionally, one or more of the network devices can be multihomed, i.e., physically connected to a plurality of communication links on the same or different networks. In some implementations, a network device can have a plurality of physical interfaces to the same network. In other implementations, a network device can have a plurality of physical interfaces to different networks. Multihoming can assist in providing a desired level of performance and/or reliability, for example. This disclosure contemplates the communication links can be any suitable communication link. For example, a communication link can be implemented by any medium that facilitates data exchange between the network devices including, but not limited to, wired, wireless and optical links. Example communication links include, but are not limited to, a LAN, a WAN, a MAN, Ethernet, the Internet, or any other wired or wireless link such as WiFi, WiMax, 3G or 4G. It should be understood that the EVPN shown in FIG. 1 is provided only as an example. This disclosure contemplates that the systems, devices, and methods for detection of an Ethernet segment failure described herein can be implemented in an EVPN different than the one described with regard to FIG. 1, e.g., an EVPN including different numbers and/or types of network devices, computing devices, networks, and/or communication links.

As shown in FIG. 1, the EVPN can include a plurality of provider edge devices 102, 104, 106, and 108 and a plurality of customer edge devices 110 and 120. Each of the customer edge devices 110 and 120 can optionally be a host, a router, a switch, or other type of computing device. In some implementations, each of the provider edge devices 102, 104, 106, and 108 can optionally be a packet switching device such as a router, for example. Alternatively or additionally, in a data center leaf-spine topology deployment, each of the provider edge devices 102, 104, 106, and 108 can optionally be a TOR device such as a TOR switch, for example. The provider edge devices 102, 104, 106, and 108 can be configured to provide virtual Layer 2 bridged connectivity between the customer edge devices 110 and 120. As described below, the provider edge devices 102, 104, 106, and 108 can be configured to detect an Ethernet segment failure in the EVPN according to the techniques described herein, e.g., by extending BFD to achieve rapid and efficient ESI-level failure detection. The provider edge devices 102, 104, 106, and 108 can be connected to each other via an IP infrastructure 100. For example, the IP infrastructure 100 can provide logical tunneling between the provider edge devices 102, 104, 106, and 108. Optionally, the IP infrastructure 100 can be a virtual extensible local area network (VXLAN) or a Multiprotocol Label Switching (MPLS) network. VXLAN and MPLS are networking schemes that provide a Layer 2 overlay on top of Layer 3 network infrastructure. Both VXLAN and MPLS networking schemes are known in the art and are therefore not described in further detail herein. It should be understood that VXLAN and MPLS network infrastructures are provided only as examples and that other IP infrastructures providing logical tunneling capability can be used for connecting the provider edge devices 102, 104, 106, and 108.

The provider edge devices 102, 104, 106, and 108 can be configured to perform media access control (MAC) layer (e.g., Layer 2) learning in the control plane as opposed to in the data plane. For example, the provider edge devices 102, 104, 106, and 108 can be configured to use the BGP to perform MAC layer learning. Control plane learning has advantages over data plane learning, including but not limited to, the ability to facilitate "virtualization" in a multitenant environment. In other words, it is possible to provide for network segmentation and/or traffic separation, among other features, in the multitenant environment using control plane learning. The use of a BGP control plane in both VXLAN and MPLS EVPN implementations is known in the art and is therefore not described in further detail herein. For example, Sajassi et al., *RFC 7432—BGP MPLS-Bosed Ethernet VPN*, Internet Engineering Task Force (IETF), https://tools.ietf.org/html/rfc7432 (February 2015) describes implementing a BGP control plane in an MPLS-based EVPN, and *Border Gateway Protocol Control Plane for Virtual Extensible LAN*, Cisco White Paper (January 2015) describes implementing a BGP control plane in a VXLAN-based EVPN. It should be understood that BGP is provided only as an example protocol and that other protocols can be used to facilitate MAC learning.

Figure 2:
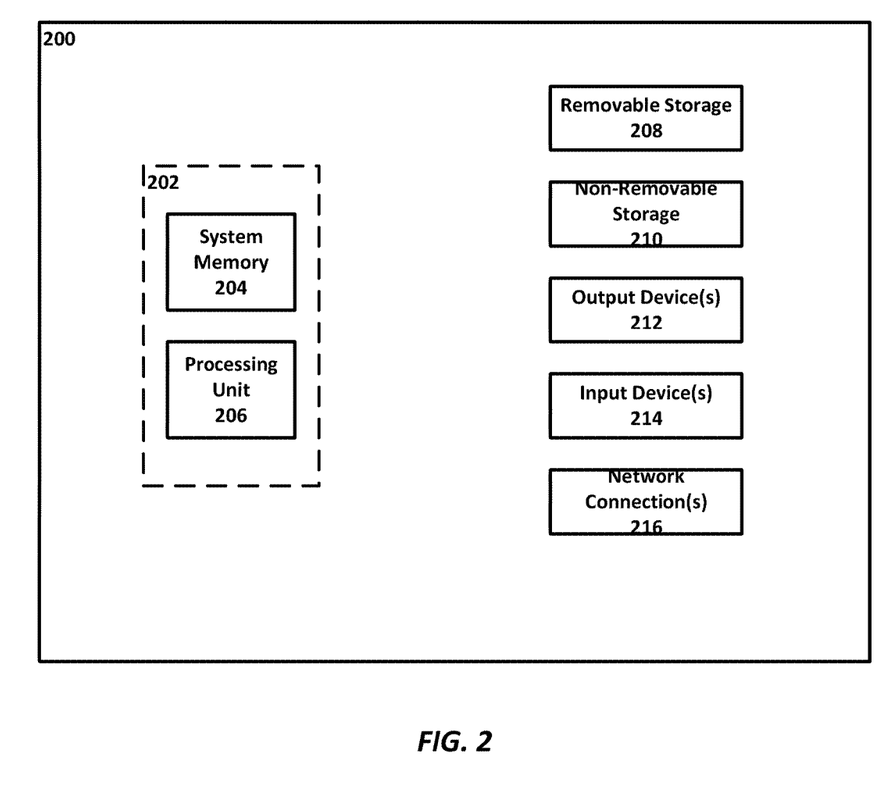
FIG. 2 is a block diagram of an example computing device.

Referring to FIG. 2, an example computing device 200 upon which embodiments of the invention may be implemented is illustrated. This disclosure contemplates that the network devices (e.g., provider edge devices 102, 104, 106, and 108 and customer edge devices 110 and 120) of FIG. 1 can include a computing device such as computing device 200 of FIG. 2. It should be understood that the example computing device 200 is only one example of a suitable computing environment upon which embodiments of the invention may be implemented. Optionally, the computing device 200 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 200 typically includes at least one processing unit 206 and system memory 204. Depending on the exact configuration and type of computing device, system memory 204 may be volatile (such as random access memory (RAM)), non-volatile (such as read-only memory (ROM), flash memory, etc.), or some combination of the two. This most basic configuration is illustrated in FIG. 2 by dashed line 202. The processing unit 206 may be a standard programmable processor that performs arithmetic and logic operations necessary for operation of the computing device 200. The computing device 200 may also include a bus or other communication mechanism for communicating information among various components of the computing device 200.

Computing device 200 may have additional features/functionality. For example, computing device 200 may include additional storage such as removable storage 208 and non-removable storage 210 including, but not limited to, magnetic or optical disks or tapes. Computing device 200 may also contain network connection(s) 216 that allow the device to communicate with other devices. Computing device 200 may also have input device(s) 214 such as a keyboard, mouse, touch screen, etc. Output device(s) 212 such as a display, speakers, printer, etc. may also be included. The additional devices may be connected to the bus in order to facilitate communication of data among the components of the computing device 200. All these devices are well known in the art and need not be discussed at length here.

The processing unit 206 may be configured to execute program code encoded in tangible, computer-readable media. Tangible, computer-readable media refers to any media that is capable of providing data that causes the computing device 200 (i.e., a machine) to operate in a particular fashion. Various computer-readable media may be utilized to provide instructions to the processing unit 206 for execution. Example tangible, computer-readable media may include, but is not limited to, volatile media, non-volatile media, removable media and non-removable media implemented in any method or technology for storage of information such as computer readable instructions, data structures, program modules or other data. System memory 204, removable storage 208, and non-removable storage 210 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 206 may execute program code stored in the system memory 204. For example, the bus may carry data to the system memory 204, from which the processing unit 206 receives and executes instructions. The data received by the system memory 204 may optionally be stored on the removable storage 208 or the non-removable storage 210 before or after execution by the processing unit 206.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

It should be appreciated that the logical operations described herein with respect to the various figures may be implemented (1) as a sequence of computer implemented acts or program modules (i.e., software) running on a computing device (e.g., the computing device described in FIG. 2), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 3:
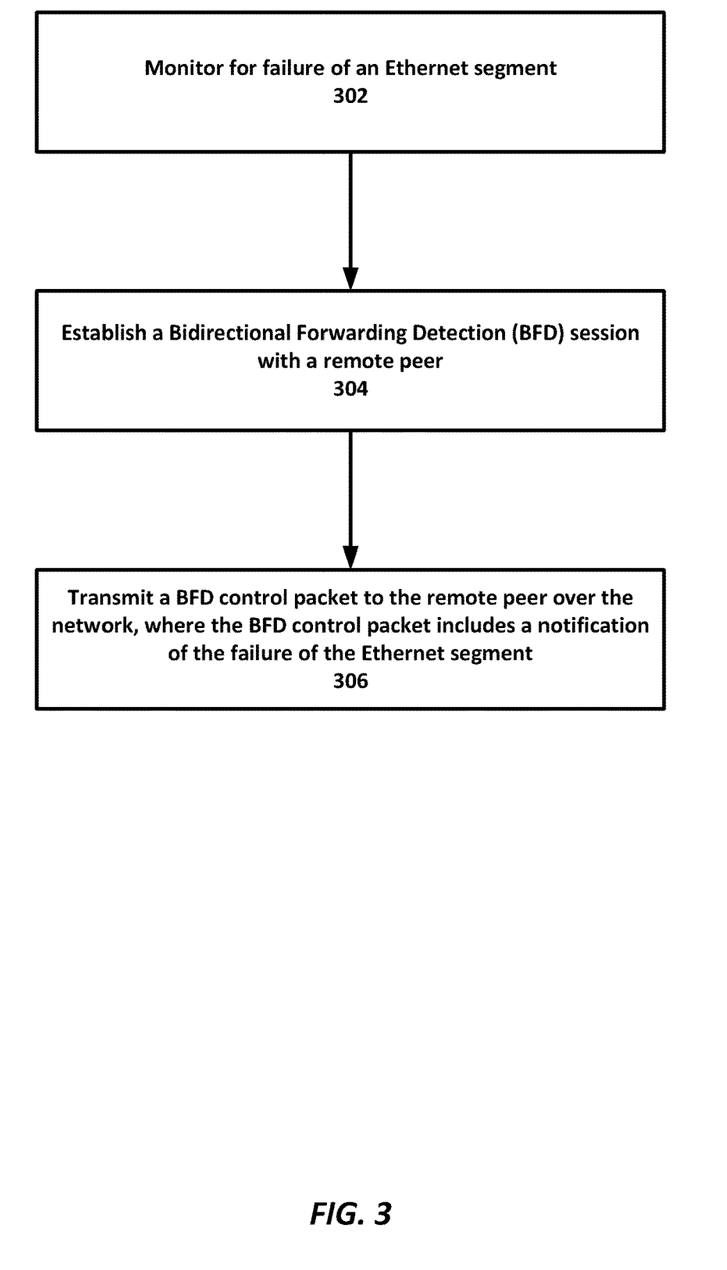
FIG. 3 is a flow diagram illustrating example operations for detecting an Ethernet segment failure in an EVPN according to implementations described herein.

Referring now to FIG. 3, example operations for detecting an Ethernet segment failure in an EVPN (e.g., the EVPN of FIG. 1) is shown. This disclosure contemplates that the local and remote peers (sometimes referred to herein as "local and remote network devices") described below can be the provider edge devices shown in FIG. 1. At 302, a local peer (e.g., a provider edge device shown in FIG. 1) can monitor for failure of an Ethernet segment, i.e., a set of one or more Ethernet communication links. An Ethernet segment can optionally be a port channel or port bundle. For example, an Ethernet segment can connect the local peer to a customer edge device shown in FIG. 1. Additionally, each Ethernet segment in the EVPN can be assigned a unique non-zero identifier, which is referred to as an Ethernet Segment Identifier (ESI). ESI's are typically 10 byte values and can be assigned and encoded according to any technique known in the art. For example, Sajassi et al., *RFC 7432—BGP MPLS-Bosed Ethernet VPN* discusses an example technique for assigning and encoding ESI values. Optionally, the local peer can be configured to monitor an ESI of a remote peer only when the local peer has a local flow with an endpoint on the particular remote peer and the particular ESI. As described below, the local peer can monitor the availability of ESI's configured on remote peer(s) through receipt of BFD control packets including ESI indexes. It should be understood that this provides for scalability by reducing the number of ESI's monitored by the local peer.

At 304, the local peer can establish a BFD session with a remote peer (e.g., another provider edge device shown in FIG. 1). The local and remote peers can be communicatively connected via a network (e.g., the IP infrastructure shown in FIG. 1), e.g., a VXLAN or MPLS network. The BFD protocol provides a low-overhead, short-duration (e.g., as fast as about 50 milliseconds) mechanism to detect failures in the forwarding path between adjacent network devices. The BFD protocol can be enabled on the local and remote peers at Layer 2 and Layer 3. Using the BFD protocol, a BFD session can be created and the local and remote peers can begin to transmit and receive BFD control packets over the network (e.g., VXLAN or MPLS network). The local and remote peers can negotiate a predetermined timing for transmitting BFD control packets. For example, the predetermined time interval for transmitting BFD control packets can be about 50 milliseconds. This disclosure contemplates that the predetermined time interval can be more or less than about 50 milliseconds, which is provided only as an example. The BFD protocol is a failure detection protocol known in the art and is therefore not described in further detail herein. For example, the BFD protocol is described in detail in Katz, D. et al., *RFC 5880—Bidirectional Forwarding Detection (BFD)*, Internet Engineering Task Force (IETF), https://tools.ietf.org/html/rfc5880 (June 2010).

Optionally, the BFD control packet can be a User Data Protocol (UDP) packet. In some implementations, the BFD control packet can be encapsulated in a VXLAN packet prior to transmission. The use of the BFD protocol for VXLAN is known in the art and therefore not described in further detail herein. For example, the use of the BFD protocol for VXLAN is described in detail in Pallagatti, S., *BFD for VXLAN*, Internet Engineering Task Force, https://tools.ietf.org/html/draft-spallagatti-bfd-vxlan-03 (Apr. 16, 2016). Conventionally, the use of the BFD protocol for VXLAN does not include detecting failure at the granularity of an ESI or monitoring ESI availability on a remote peer as described below. Alternatively, in other implementations, the BFD control packet can be encapsulated in a MPLS packet prior to transmission. The use of the BFD protocol for MPLS Label Switched Paths (LSPs) is known in the art and therefore not described in further detail herein. For example, the use of the BFD protocol for MPLS LPS is described in detail in Aggarwal, R. et al., *RFC 5884—Bidirectional Forwarding Detection (BFD) for MPLS Label Switched Paths (LSPs)*, Internet Engineering Task Force (IETF), https://tools.ietf.org/html/rfc5884 (June 2010). Conventionally, the use of the BFD protocol for MPLS networks does not include detecting failure at the granularity of an ESI or monitoring ESI availability on a remote peer as described below.

Figure 5A:
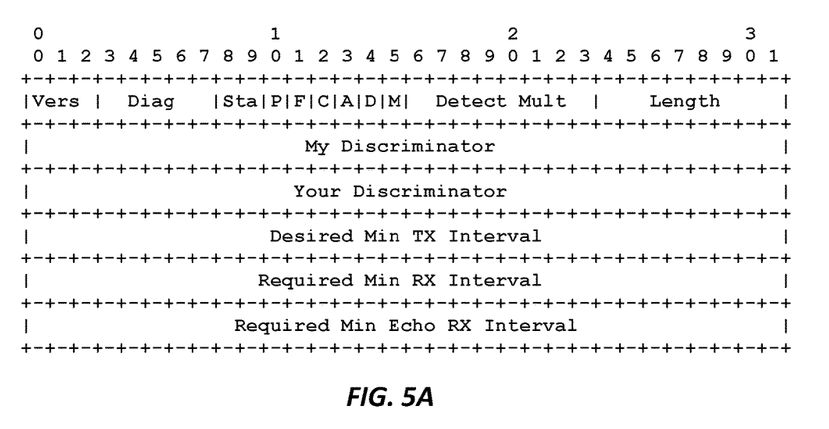
FIG. 5A illustrates the mandatory section of the BFD control packet.
Figure 5B:
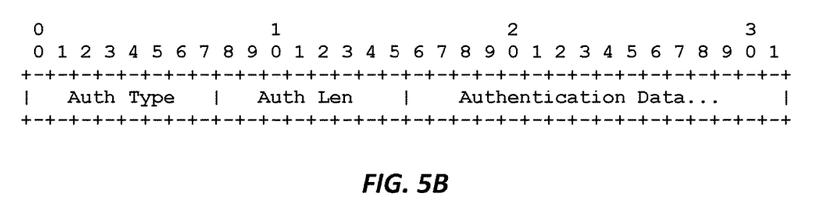
FIG. 5B illustrates the optional authentication section of the BFD control packet.

BFD control packets can be sent in an encapsulation appropriate to the environment (e.g., VXLAN or MPLS) as discussed above. A BFD control packet can include a Mandatory Section and an optional Authentication Section. BFD control packets are described in further detail in Katz, D. et al., *RFC 5880—Bidirectional Forwarding Detection (BFD)*. An example BFD control packet according to Katz, D. et al., *RFC 5880—Bidirectional Forwarding Detection (BFD)* is shown in FIGS. 5A and 5B. FIG. 5A shows the Mandatory Section of a BFD Control Packet, and FIG. 5B shows the Optional Authentication Section of a BFD control packet. As shown in FIGS. 5A and 5B, the BFD control packet can include:

Version (Vers): The version number of the protocol.

Diagnostic (Diag): A diagnostic code specifying the local peer's reason for the last change in session state, which allows the remote peer(s) to determine the reason that the previous session failed, for example.

State (Sta): The current BFD session state as seen by the transmitting system.

Poll (P): If set, the transmitting system is requesting verification of connectivity, or of a parameter change, and is expecting a packet with the Final (F) bit in reply. If clear, the transmitting system is not requesting verification.

Final (F): If set, the transmitting system is responding to a received BFD control packet that had the Poll (P) bit set. If clear, the transmitting system is not responding to a Poll.

Control Plane Independent (C): If set, the transmitting system's BFD implementation does not share fate with its control plane. If clear, the transmitting system's BFD implementation shares fate with its control plane.

Authentication Present (A): If set, the Authentication Section is present and the session is to be authenticated.

Demand (D): If set, Demand mode is active in the transmitting system. If clear, Demand mode is not active in the transmitting system.

Multipoint (M): This bit is reserved for future point-to-multipoint extensions to BFD.

Detect Mult: Detection time multiplier. The negotiated transmit interval, multiplied by this value, provides the Detection Time for the receiving system in Asynchronous mode.

Length: Length of the BFD control packet, in bytes.

My Discriminator: A unique, nonzero discriminator value generated by the transmitting system, used to demultiplex multiple BFD sessions between the same pair of systems.

Your Discriminator: The discriminator received from the corresponding remote peer. This field reflects back the received value of My Discriminator, or is zero if that value is unknown.

Desired Min TX Interval: This is the minimum interval, in microseconds, that the local peer would like to use when transmitting BFD Control packets, less any jitter applied.

Required Min RX Interval: This is the minimum interval, in microseconds, between received BFD control packets that this system is capable of supporting, less any jitter applied by the sender.

Required Min Echo RX Interval: This is the minimum interval, in microseconds, between received BFD Echo packets that this system is capable of supporting, less any jitter applied by the sender.

Auth Type: The authentication type in use, if the Authentication Present (A) bit is set.

Auth Len: The length, in bytes, of the authentication section, including the Auth Type and Auth Len fields.

The Optional Section of the BFD control packet is dependent upon the type of authentication used. It should be understood that the BFD control packet described above is provided only as an example and that the BFD control packet can include more, less, and/or different information.

Figure 4:
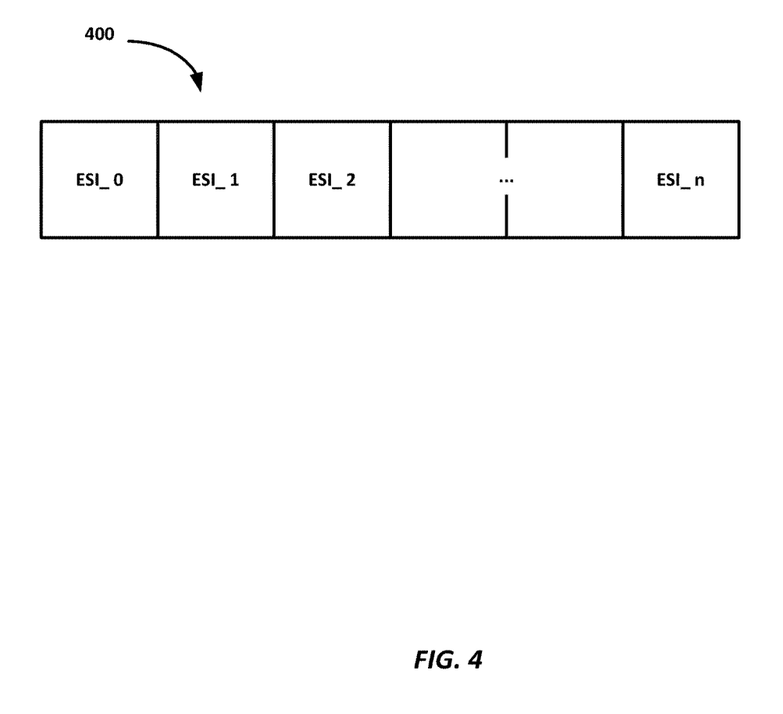
FIG. 4 illustrates an example ESI index according to implementations described herein.

At 306, the local peer can transmit the BFD control packet to the remote peer over the network (e.g., VXLAN or MPLS network). The BFD control packet can include a notification of the failure of the Ethernet segment. In other words, the notification of the failure of the Ethernet segment can be added to the BFD control packet. As discussed above, the use of the BFD protocol with both VXLAN and MPLS networking schemes is known in the art. Conventionally, the BFD protocol is used with VXLAN and MPLS networking schemes to detect failure of provider edge devices. However, the conventional use of the BFD protocol with VXLAN and MPLS networking schemes does not include detection of Ethernet segment failures, e.g., detection at the granularity of a port channel or port bundle, as described herein. Additionally, the conventional use of the BFD protocol with VXLAN and MPLS networking schemes does not provide for monitoring of ESI's available on a remote peer, as described herein. Each Ethernet segment in the EVPN can be assigned an ESI, which is typically a 10 byte value. In order to efficiently include the notification of the failure of an Ethernet segment in a BFD control packet, the local peer can maintain an ESI index. An example ESI index 400 is shown in FIG. 4. The ESI index 400 can include a plurality of entries (e.g., entries ESI_0, ESI_1, ESI_2, . . . , ESI_n). Each of the entries in the ESI index 400 can store a respective status of a locally configured ESI. For example, a value of "1" can indicate a functional locally configured ESI, and a value of "0" can indicate a failed locally configured ESI. In addition, an entry in the ESI index 400 can be updated (e.g., entry value changed from "1" to "0") in response to detecting the failure of an Ethernet segment. In other words, the ESI index 400 can be a bitmap, e.g., each of the entries of the ESI index can have a length of 1 bit, and the value of an entry (e.g., a bit) can be updated or changed in response to detecting the failure of an Ethernet segment. By using a bitmap, it is possible to indicate the statuses of locally configured ESI's more efficiently. For example, if the local peer has sixty-four locally configured port channels (e.g., 64 ESI's), the ESI index has a length of only 8 bytes (e.g., 1 bit per locally configured ESI). The ESI index can therefore provide a single, efficiently packed message that is capable of tracking a large number of ESI's. As described below, by transmitting the ESI index to remote peer(s), it is possible for the remote peer(s) to monitor availability of ESI's configured on the local peer. Upon receipt of the ESI index from the local peer, the remote peer can remove the EAD/ES route more rapidly withdraw EAD/ES routes as compared to the conventional technique for EAD/ES route withdrawal using BGP. Additionally, a single BFD session between the local and remote peers can be used to track all of the ESI's.

Figure 6:
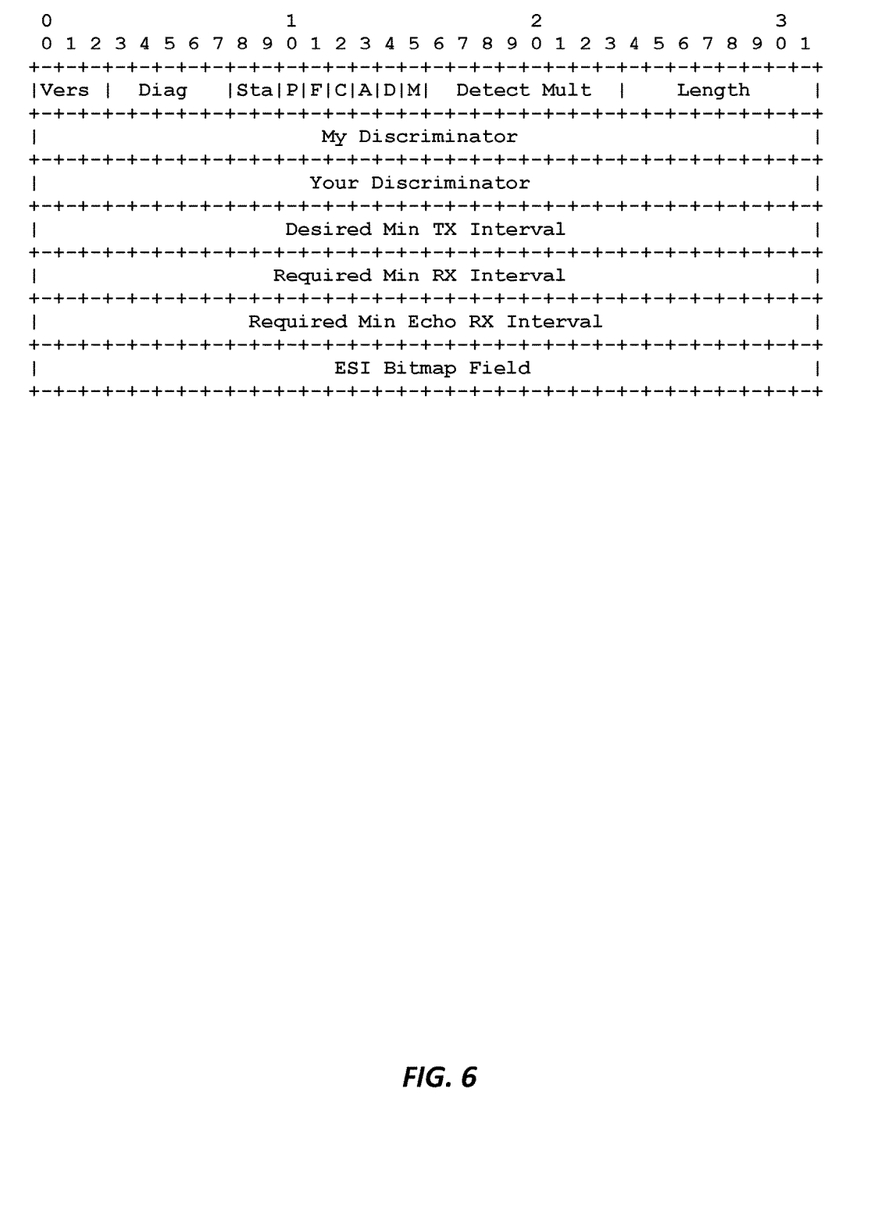
FIG. 6 illustrates the proposed BFD control packet according to an implementation described herein.

The ESI index 400 can be added to a BFD control packet as the notification of the failure of the Ethernet segment. For example, a new field (e.g., ESI Bitmap Field) can be added to the end of a BFD control packet such as the BFD control packet described in Katz, D. et al., *RFC 5880—Bidirectional Forwarding Detection (BFD)*. For example, the proposed BFD control packet is shown in FIG. 6.

The Length field of the BFD control packet can be used to also indicate the length of the ESI Bitmap Field, if the ESI-Bitmap is added to the BFD control packet. The ESI Bitmap Field can carry variable data and can be used for sending the ESI index 400, which includes the statuses of the associated locally configured ESI values for a given peer.

As described above, in response to detecting the failure of an Ethernet segment, the local peer can update or change the corresponding entry in its ESI index (e.g., entry value changed from "1" to "0"). The ESI index is then added to a BFD control packet and transmitted to a remote peer. Upon receipt of the BFD control packet with the updated ESI index, the remote peer receives notification of the failure of the Ethernet segment by determining that the entry in the ESI index was updated. This allows the remote peer to monitor the status of ESI's that are locally configured on the local peer. In response, a route from the local peer pertaining to the failed ESI can be withdrawn by the remote peer. This results in more rapid withdrawal of EAD/ES routes as compared to the conventional technique for EAD/ES route withdrawal using BGP. The route can be an EAD route (i.e., EVPN Route Type 1) or an ES route (i.e., EVPN Route Type 4). It should be understood that the route type can be encoded in the Network Layer Reachability Information (NLRI), which can be exchanged by the local and remote peers using BGP.

Alternatively or additionally, a remote BFD control packet can be received at the local peer from the remote peer over the network (e.g., VXLAN or MPLS network). The remote BFD control packet can include a notification of a failure of a remotely configured ESI, i.e., an ESI configured locally on the remote peer. The notification of the failure of the remotely configured ESI can include a remote ESI index (e.g., the ESI index shown in FIG. 4). As discussed above, the local peer receives notice of the failure of the remotely configured ESI by determining that the entry in the remote ESI index has been updated (e.g., entry value changed from "1" to "0"). This allows the local peer to monitor the status of ESI's that are locally configured on the remote peer. Additionally, in response to receiving the remote BFD control packet, a route (e.g., an EAD route or an ES route) from the remote peer pertaining to the failed remotely configured ESI can be withdrawn by the local peer. This results in more rapid withdrawal of EAD/ES routes as compared to the conventional technique for EAD/ES route withdrawal using BGP.

As described above, the ESI index stores respective statuses of locally configured ESI's. For example, these statuses are stored as a bitmap. It should be understood that the local and remote peers may not store the status of the same ESI in the same entry in their respective ESI index. For example, the local peer may store the status of ESI "X" in entry ESI_0 of its ESI index, while the remote peer may store the status of ESI "X" in entry ESI_2 of its ESI index. In other words, the ESI index itself does not carry information about the ESI values. Thus, when the remote peer receives a BFD control message from the local peer indicating that the status of entry ESI_0 in the local peer's ESI index has changed, the remote peer needs a mechanism to link entry ESI_0 in the local peer's ESI index to ESI "X". This can be performed by the local and remote peers using BGP. For example, when sending an EAD route (i.e., EVPN Route Type 1) or an ES route (i.e., EVPN Route Type 4) using BGP, the local peer can add the respective entry identifier (e.g., entry ESI_0, ESI_1, ESI_2, . . . , or ESI_n of the ESI index shown in FIG. 4) pertaining to the respective ESI. This information can be appended using a BGP Extended Community. The proposed BGP Extended Community can carry only the respective entry identifier (e.g., entry ESI_0, ESI_1, ESI_2, . . . , or ESI_n of the ESI index shown in FIG. 4) pertaining to the respective ESI, and the ESI value would be the one present in the EVPN Route Type 1 and EVPN Route Type 4 NRLI. Accordingly, the remote peer can create and maintain a table storing the respective correspondences between entries in the local peer's ESI index and the ESI values of the local peer's locally configured Ethernet segments. Thus, the remote peer can access this table to look up the ESI value that corresponds to the ESI index entry that has been updated or changed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A network device for detecting an Ethernet segment failure in an Ethernet virtual private network (EVPN), comprising:
   a processor and a memory operably coupled to the processor, the memory having computer-executable instructions stored thereon that, when executed by the processor, cause the processor to:
   monitor for failure of an Ethernet segment;
   establish a bidirectional forwarding detection (BFD) session with a remote network device; and
   transmit a BFD control packet to the remote network device over a network, wherein the BFD control packet comprises an Ethernet Segment Identifier (ESI) index bitmap, and wherein the ESI index bitmap includes a notification of the failure of the Ethernet segment.

2. The network device of claim 1, wherein the BFD control packet comprises a User Data Protocol (UDP) packet.

3. The network device of claim 1, wherein the network is a virtual extensible local area network (VXLAN) or a Multiprotocol Label Switching (MPLS) network.

4. The network device of claim 3, wherein the memory has further computer-executable instructions stored thereon that, when executed by the processor, cause the processor to encapsulate the BFD control packet in a VXLAN packet or a MPLS packet prior to transmitting the BFD control packet to the remote network device.

5. The network device of claim 1, wherein the memory has further computer-executable instructions stored thereon that, when executed by the processor, cause the processor to:
   maintain the ESI index bitmap comprising a plurality of entries, wherein each of the entries stores a respective status of a locally configured ESI; and
   update an entry in the ESI index bitmap in response to detecting the failure of the Ethernet segment.

6. The network device of claim 5, wherein each of the entries of the ESI index bitmap has a length of 1 bit.

7. The network device of claim 1, wherein the memory has further computer-executable instructions stored thereon that, when executed by the processor, cause the processor to:
   receive a remote BFD control packet from the remote network device over the network, wherein the remote BFD control packet comprises a notification of a failure of a remotely configured ESI; and
   in response to receiving the remote BFD control packet, withdraw a route from the remote network device pertaining to the failed remotely configured ESI.

8. The network device of claim 7, wherein the notification of the failure of the remotely configured ESI comprises a remote ESI index bitmap comprising a plurality of entries, wherein each of the entries stores a respective status of a remotely configured ESI.

9. The network device of claim 1, wherein the memory has further computer-executable instructions stored thereon that, when executed by the processor, cause the processor to transmit a plurality of BFD control packets at a predetermined time interval.

10. A method for detecting an Ethernet segment failure in an Ethernet virtual private network (EVPN), comprising:
    monitoring for failure of an Ethernet segment;
    establishing a bidirectional forwarding detection (BFD) session with a remote peer; and
    transmitting a BFD control packet to the remote peer over a network, wherein the BFD control packet comprises an Ethernet Segment Identifier (ESI) index bitmap, and wherein the ESI index bitmap includes a notification of the failure of the Ethernet segment.

11. The method of claim 10, wherein the BFD control packet comprises a User Data Protocol (UDP) packet.

12. The method of claim 10, wherein the network is a virtual extensible local area network (VXLAN) or a Multiprotocol Label Switching (MPLS) network.

13. The method of claim 12, further comprising, prior to transmitting the BFD control packet, encapsulating the BFD control packet in a VXLAN packet or a MPLS packet.

14. The method of claim 10, further comprising:
    maintaining the ESI index bitmap comprising a plurality of entries, wherein each of the entries stores a respective status of a locally configured ESI; and
    updating an entry in the ESI index bitmap in response to detecting the failure of the Ethernet segment.

15. The method of claim 10, further comprising:
    receiving a remote BFD control packet from the remote peer over the network, wherein the remote BFD control packet comprises a notification of a failure of a remotely configured ESI; and
    in response to receiving the remote BFD control packet, withdrawing a route from the remote peer pertaining to the failed remotely configured ESI.

16. A Ethernet virtual private network (EVPN), comprising:
    a local network device; and
    a remote network device communicatively connected to the local network device, wherein the local network device comprises a processor and a memory operably coupled to the processor, the memory having computer-executable instructions stored thereon that, when executed by the processor, cause the processor to:
    monitor for failure of an Ethernet segment;
    establish a bidirectional forwarding detection (BFD) session with the remote network device; and
    transmit a BFD control packet to the remote network device, wherein the BFD control packet comprises an Ethernet Segment Identifier (ESI) index bitmap, and wherein the ESI index bitmap includes a notification of the failure of the Ethernet segment.

17. The EVPN of claim 16, wherein each of the local and remote network devices is a top-of-the-rack (TOR) device.

* * * * *